Patented May 27, 1947

2,421,233

UNITED STATES PATENT OFFICE 2,421,233

UREIDO ACID ESTERS AND METHOD OF MAKING THE SAME

Reginald Auchincloss and Fred Linsker, New York, N. Y.

No Drawing. Application February 28, 1945, Serial No. 580,276

8 Claims. (Cl. 260—482)

The present invention is directed to ureido compounds and a method of making the same, and more particularly relates to the ureido compounds of glutaric acid and esters thereof.

The compounds produced in accordance with the present invention are capable of application to various fields. The compounds are of substantial nutritive value and may be used in special diets. The compounds may also be used in therapy, as in the treatment of certain diseases, particularly where there are deficiencies. Various other uses for the present invention may be obtained as in organic synthetic work as intermediate compounds.

The present invention may utilize as a starting material an amino aliphatic carboxylic acid, particularly an acid having two or more carboxy groups. In a specific example of the invention, glutamic acid may be used.

In practicing the method of the present invention, the amino acid is treated with an alcohol under such conditions as to cause esterification of at least one of the acid groups and preferably so as to form a neutral ester in which all of the carboxy groups have been esterified.

The ester thus formed is acidified, as for example, by the use of hydrochloric acid in order to form the hydrochloride thereof. The latter compound is then mixed in suitable solution with a soluble cyanate and a reaction results whereby the cyanate radical is attached to the amino group, the acid combined therewith being split off. When the process is conducted in water solution, the ureide so formed is precipitated and may be recovered from the solution of salt and any excess cyanate which remains. The product may be purified as desired and may be converted into the free acid by removal of the esterifying groups in the usual manner.

The following is a specific example of the operation of the present invention: Glutamic acid (1-amino glutaric acid) is mixed with ethyl alcohol and dry gaseous hydrochloric acid is bubbled in until the reaction is complete and both of the carboxy groups are esterified. The temperature is allowed to rise during the reaction. The reaction which takes place may be indicated as follows:

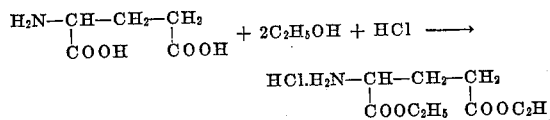

Preferably this reaction proceeds by the use of absolute alcohol mixed with the glutamic acid and the introduction into the reaction mass of dry gaseous hydrochloric acid in order to facilitate the reaction.

In the next step, 11.95 grams (0.05 mol) of d-glutamic acid di-ethyl ester hydrochloride are dissolved in 10 cubic centimeters of water and to this solution is slowly added with stirring a solution of 4.0 grams (0.05 mol) of potassium cyanate in 15 cubic centimeters of water. After the addition is completed, the reaction product precipitates out in a few minutes and is filtered on a Buchner funnel with suction. The white solid is recrystallized from boiling water and appears as colorless needles melting at 93 degrees centigrade.

The reaction may be considered to be in accordance with the following equation.

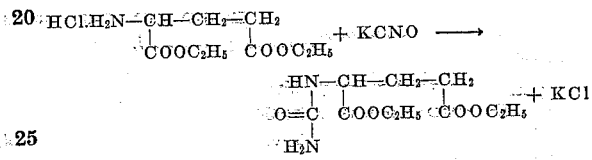

Analysis confirms the 1-ureido glutaric diethyl ester as follows:

|  | Theoretical | Found |
| --- | --- | --- |
|  | Per cent |  |
| Nitrogen | 11.38 | 11.46 |
| Carbon | 48.74 | 48.63 |
| Hydrogen | 7.37 | 7.01 |

In order to produce the free acid of the ureide, the ethyl groups may be split off by hydrolysis, as is well-known. Also, various other reactions may be entered into by the ureido ester formed as set forth above, wherein addition or modification reaction products are obtained.

Although we have described the invention by use of a single specific embodiment thereof, it will be apparent that various other compounds may be used in the practice of the present invention. It is not necessary that ethyl alcohol be used as the esterifying agent as other alcohols, both aliphatic and aromatic, may be used, such as methyl, propyl, cyclohexyl, and the like. Other acids than glutamic may be used as the starting material, it being essential that the acid have at least one amino group. In view of this, the products made in accordance with the present invention may be considered as compounds having the following structural formula:

$$\begin{array}{c} H-N-CH-R-COOR'' \\ | \quad | \\ O=C \quad COOR' \\ | \\ NH_2 \end{array}$$

wherein R is an aliphatic hydrocarbon group having at least 1 carbon atom, R' is hydrogen or a hydrocarbon group, and R'' is hydrogen or a hydrocarbon group.

From the above, it will be apparent that the present invention is broad and is not to be limited except by the character of the claims appended hereto.

We claim:

1. A method of making ureides which comprises providing an amino aliphatic carboxylic acid, reacting the same with an alcohol to form an ester of said acid in the presence of an added acid to promote the reaction, mixing said ester with a salt of cyanic acid to cause a reaction therebetween to form the mono-ureide of the ester.

2. A method of making ureides which comprises providing an amino aliphatic carboxylic acid, reacting the same with an alcohol to form an ester of said acid, rendering the same acid, mixing said ester with a salt of cyanic acid to cause a reaction therebetween to form the mono-ureide of the ester.

3. A method of making ureides which comprises providing an amino aliphatic carboxylic acid, reacting the same with an alcohol to form an ester of said acid, adding sufficient acid thereto to combine with the $NH_2$ group of said ester, mixing said ester with a salt of cyanic acid to cause a reaction therebetween to form the mono-ureide of the ester.

4. A method of making ureido glutaric acid compounds which comprises providing glutamic acid, reacting the same with an alcohol to form a glutamic acid ester in the presence of an added acid to promote the reaction, mixing said ester with a salt of cyanic acid to cause a reaction therebetween to form a mono-ureido glutaric acid ester.

5. A method of making ureido glutaric acid compounds which comprises providing glutamic acid, reacting the same with an alcohol to form a glutamic acid ester, acidifying said ester, mixing said ester with a salt of cyanic acid to cause a reaction therebetween to form a mono-ureido glutaric acid ester.

6. A method of making ureido glutaric acid compounds which comprises providing glutamic acid, reacting the same with an alcohol to form a glutamic acid ester, forming the hydrochloride of said ester, mixing said ester with a salt of cyanic acid to cause a reaction therebetween to form a mono-ureido glutaric acid ester.

7. A method of making ureido glutaric acid compounds which comprises providing glutamic acid, reacting the same with an alcohol to form a glutamic acid ester, acidifying said ester, dissolving the same in water, mixing said ester with a water solution of a salt of cyanic acid to cause a reaction therebetween to form a mono-ureido glutaric acid ester.

8. The ureide of diethyl glutarate having the following structural formula:

$$\begin{array}{c} H-N-CH-CH_2-CH_2 \\ | \quad | \quad | \\ O=C \quad COOC_2H_5 \quad COOC_2H_5 \\ | \\ NH_2 \end{array}$$

REGINALD AUCHINCLOSS.
FRED LINSKER.

REFERENCES CITED

The following references are of record in the file of this patent:

UNITED STATES PATENTS

| Number | Name | Date |
| --- | --- | --- |
| 2,090,594 | Jacobson | Aug. 17, 1937 |
| 2,317,378 | Harris | Apr. 27, 1943 |

FOREIGN PATENTS

| Number | Country | Date |
| --- | --- | --- |
| 470,461 | Great Britain | 1937 |

OTHER REFERENCES

Chemical Abstracts, vol. 35 (1941), p. 1768.
Chemical Abstracts, vol. 33 (1939), pp. 139–140.
Chemical Abstracts, vol. 32 (1938), pp. 6628–6629.
Beilstein, "Handbuch der Org. Chemie," IV ed., vol. IV, p. 492.
Karrer, "Organic Chemistry" (1938), p. 207.